US008944622B2

(12) United States Patent
Jang

(10) Patent No.: US 8,944,622 B2
(45) Date of Patent: Feb. 3, 2015

(54) LIGHTING SYSTEM HAVING REFLECTOR SUPPORT AND DISPLAY DEVICE

(75) Inventor: Young Bae Jang, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 66 days.

(21) Appl. No.: 13/354,588

(22) Filed: Jan. 20, 2012

(65) Prior Publication Data

US 2013/0044460 A1    Feb. 21, 2013

(30) Foreign Application Priority Data

Aug. 18, 2011   (KR) ........................ 10-2011-0082167

(51) Int. Cl.
| G09F 13/04 | (2006.01) |
|---|---|
| G09F 13/08 | (2006.01) |
| F21V 7/00 | (2006.01) |
| F21V 7/07 | (2006.01) |
| F21V 7/09 | (2006.01) |
| F21V 1/00 | (2006.01) |
| F21V 5/00 | (2006.01) |
| G02F 1/1335 | (2006.01) |
| G02F 1/1333 | (2006.01) |

(52) U.S. Cl.
CPC ............... *G02F 1/133615* (2013.01); *G02F 2001/133314* (2013.01); *G02F 2201/34* (2013.01)
USPC ... 362/97.1; 362/97.2; 362/97.3; 362/296.01; 362/296.05; 362/217.05

(58) Field of Classification Search
USPC ............ 362/97.1–97.4, 294, 296.01, 217.05, 362/241; 349/67
See application file for complete search history.

(56) References Cited

U.S. PATENT DOCUMENTS

| 7,465,062 | B2 * | 12/2008 | Kwon ........................... 362/225 |
|---|---|---|---|
| 7,473,019 | B2 * | 1/2009 | Laski ............................ 362/612 |
| 7,604,365 | B2 * | 10/2009 | Chang .......................... 362/97.1 |
| 7,758,206 | B2 * | 7/2010 | Kim ......................... 362/217.05 |
| 8,300,176 | B2 * | 10/2012 | Hung ............................. 349/65 |
| 8,376,578 | B2 * | 2/2013 | Kong et al. .............. 362/249.02 |
| 2005/0002173 | A1 * | 1/2005 | Chuang et al. ................. 362/31 |
| 2006/0146512 | A1 * | 7/2006 | Choi ............................... 362/29 |
| 2006/0158905 | A1 * | 7/2006 | Lai et al. ...................... 362/634 |
| 2007/0171626 | A1 * | 7/2007 | Chang ............................ 362/97 |
| 2007/0171676 | A1 * | 7/2007 | Chang .......................... 362/613 |
| 2007/0242446 | A1 * | 10/2007 | Lee ................................ 362/29 |
| 2008/0186431 | A1 * | 8/2008 | Imojo et al. .................... 349/65 |
| 2009/0256988 | A1 * | 10/2009 | Kim et al. ...................... 349/58 |
| 2012/0169942 | A1 * | 7/2012 | Kuromizu ..................... 348/739 |
| 2012/0169944 | A1 * | 7/2012 | Kuromizu ..................... 348/790 |
| 2012/0176557 | A1 * | 7/2012 | Shimizu ........................ 348/790 |

OTHER PUBLICATIONS

European Search Report dated Nov. 28, 2012 issued in Application No. 12 15 1798.

* cited by examiner

*Primary Examiner* — Ismael Negron
*Assistant Examiner* — Erin Kryukova
(74) *Attorney, Agent, or Firm* — Ked & Associates, LLP

(57) ABSTRACT

Disclosed herein are a backlight unit and a lighting system including the same. The backlight unit includes a first reflector and a bottom cover, a plurality of reflector support parts disposed on the bottom cover, each of the reflector support parts including at least two first and second slanted surfaces adjacent to each other about at least one inflection point, a second reflector disposed on the plural reflector support parts, and a light source module disposed between the first reflector and each of the second reflector.

18 Claims, 10 Drawing Sheets

LIGHTING SYSTEM HAVING REFLECTOR SUPPORT AND DISPLAY DEVICE

CROSS REFERENCE TO RELATED APPLICATION

This application claims priority under 35 U.S.C. §119 to Korean Patent Application No. 10-2011-0082167, filed in Korea on Aug. 18, 2011, which is hereby incorporated in its entirety by reference as if fully set forth herein.

TECHNICAL FIELD

Embodiments relate to a backlight unit and a lighting system including the same.

BACKGROUND

In general, as a typical large-scale display device, a Liquid Crystal Display (LCD), a Plasma Display Panel (PDP), etc. is used.

Unlike the self-emission type PDP, the LCD requires a separate backlight unit due to absence of a self light emitting element.

A backlight unit for use in the LCD is classified into an edge type backlight unit and a direct type backlight unit according to a position of a light source. In the edge type backlight unit, light sources are disposed at left and right side faces or upper and lower side faces of an LCD panel and a light guide plate is provided to uniformly disperse light throughout a front surface of the LCD panel, thereby ensuring uniform luminance and enabling production of an extremely thin display panel.

The direct type backlight unit is generally applied to displays of 20 inches or more. The direct type backlight unit advantageously has greater lighting efficiency than the edge type backlight unit owing to a plurality of light sources being disposed beneath a panel, and thus is mainly used in large-scale displays requiring high luminance.

The conventional edge type or direct type backlight unit adopts a Cold Cathode Fluorescent Lamp (CCFL) as a light source.

The backlight unit using the CCFL, however, has several disadvantages, such as consumption of a great quantity of power because power should always be applied to the CCFL, low color reproduction efficiency of about 70% that of a Cathode Ray Tube (CRT), and environmental pollution due to use of mercury.

Currently, a backlight unit using a Light Emitting Diode (LED) is being studied as a solution to the above-mentioned problems.

In the case of the backlight unit using the LED, turning on or off a part of an LED array is possible, which can achieve remarkable reduction in power consumption. In particular, an RGB LED exhibits color reproduction beyond 100% of a color reproduction range proposed by the National Television System Committee (NTSC) and can provide more vivid images to consumers.

Further, the LED, fabricated through semiconductor processes, is environmentally friendly.

Although LCD products using the LED having the above-mentioned advantages have been introduced, these LCD products require expensive drivers, PCBs, etc. because the LED has a driving mechanism different from the conventional CCFL. For this reason, the LED backlight unit is applied only to high priced LCD products at present.

In the case of the LED backlight unit for guiding light through air without use of a separate light guide plate for guiding light emitted from the LED array to the front of a display device, a structure of a bottom cover is important in order for light emitted from the LED array to be reflected and guided to the front of the display device.

SUMMARY

Embodiments provide a backlight unit with an air guide having excellent strength and reflection characteristics and a lighting system including the same, by coupling a reflector support part equipped with slanted surfaces having different radii of curvature to a bottom cover having rigidity.

In one embodiment, a backlight unit includes a first reflector and a bottom cover, a plurality of reflector support parts disposed on the bottom cover, each of the reflector support parts including at least two first and second slanted surfaces adjacent to each other about at least one inflection point, a second reflector disposed on the plural reflector support parts, and a light source module disposed between the first reflector and the second reflector. Also, the backlight unit may further include a cover plate coupled to opposite side portions of the bottom cover, the light source module and the first reflector being disposed at the cover plate.

A central region of each of the reflector support parts may have at least one selected from the group consisting a flat plane shape, convex curved surface shape, and concave curved surface shape. The reflector support part may have a symmetrical shape based on a center of the bottom cover. The reflector support part may be fixed, at opposite ends thereof, to the cover plates.

In addition, the backlight unit may further include an optical member facing the reflector support parts and supported by the cover plates, and at least one support pin formed at an upper portion of a corresponding reflector support part to support the optical member.

Further, at least one coupling part may be formed at a rear side of a corresponding reflector support part and a bottom surface of the bottom cover, and the reflector support part may be fixed to the bottom cover by the coupling part.

The coupling part may include at least one insertion protrusion formed at the rear side of the corresponding reflector support part, and at least one insertion groove formed on the bottom surface of the bottom cover so as to allow the insertion protrusion to be fitted therein. Here, the at least one insertion protrusion may include a plurality of insertion protrusions disposed to protrude in different directions from one another.

The first slanted surface may be disposed closer to the light source module than the second slanted surface, and radii of curvature of the first and second slanted surfaces may differ from each other.

A maximum height of the first slanted surface may be equal to or differ from a maximum height of the second slanted surface. For example, the maximum height of the first slanted surface may be greater than the maximum height of the second slanted surface. The radius of curvature of the first slanted surface may be less than or equal to the radius of curvature of the second slanted surface. For example, a ratio of the radius of curvature of the first slanted surface to the radius of curvature of the second slanted surface may be in a range of 1:1 to 1:10.

A first distance between a first horizontal line extending from the inflection point and a second horizontal line extending from a distal end point of the first slanted surface may be less or greater than or equal to a second distance between the first horizontal line and a third horizontal line extending from a distal end point of the second slanted surface. For example, a ratio of the first distance to the second distance may be in a range of 1:1.1 to 1:5 or 1:0.01 to 1:1.

Also, a third distance between a first vertical line extending from the inflection point and a second vertical line extending from the distal end point of the first slanted surface may be less than or equal to a fourth distance between the first vertical line and a third vertical line extending from the distal end point of the second slanted surface. For example, a ratio of the third distance to the fourth distance may be in a range of 1:1 to 1:20.

Further, a fifth distance between the first horizontal line extending from the inflection point and a fourth horizontal line extending from a point of the light source module may be greater than the second distance between the first horizontal line and the third horizontal line extending from the distal end point of the second slanted surface.

In another embodiment, a lighting system includes a backlight unit, wherein the backlight unit includes first reflectors and a bottom cover, a plurality of reflector support parts disposed on the bottom cover, each of the reflector support parts including at least two first and second slanted surfaces adjacent to each other about at least one inflection point, second reflectors disposed on the plural reflector support parts, respectively, and a light source module arranged between each of the first reflectors and each of the second reflectors.

BRIEF DESCRIPTION OF THE DRAWINGS

Arrangements and embodiments may be described in detail with reference to the following drawings in which like reference numerals refer to like elements and wherein.

DESCRIPTION OF SPECIFIC EMBODIMENTS

Figure 1:
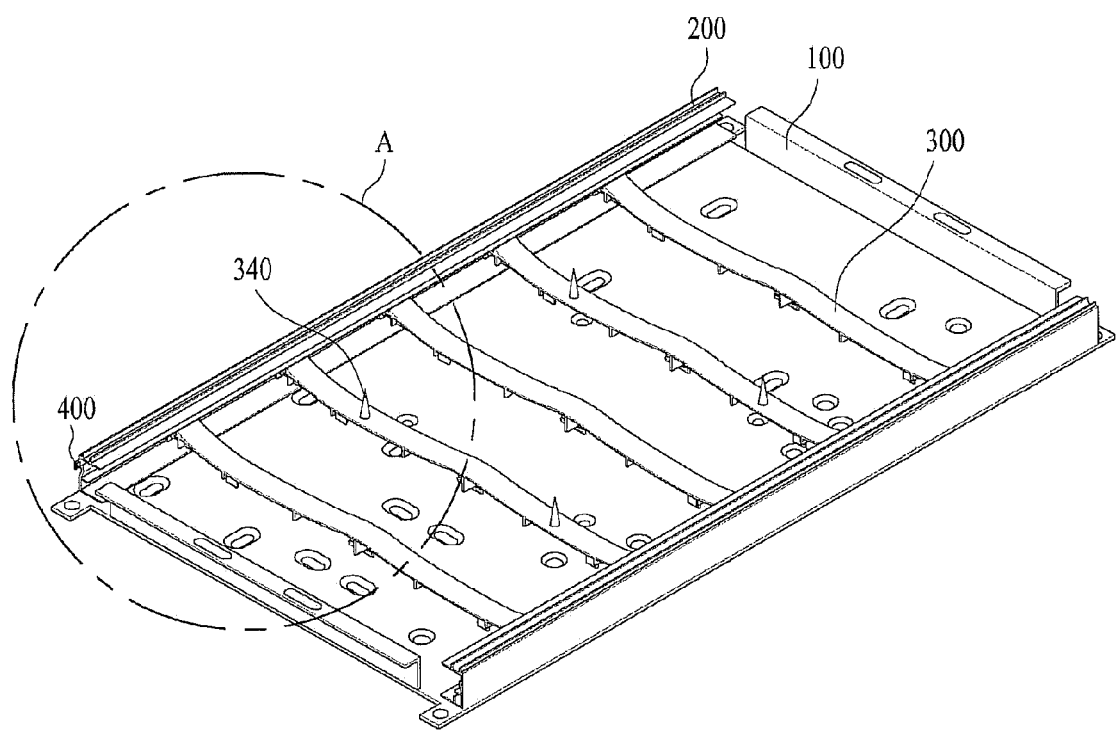
FIG. 1 is a perspective view illustrating a two-edge type backlight unit according to an embodiment.

Hereinafter, embodiments will be described with reference to the annexed drawings.

It will be understood that when an element is referred to as being 'on' or "under" another element, it can be directly on/under the element, and one or more intervening elements may also be present. When an element is referred to as being 'on' or 'under', 'under the element' as well as 'on the element' can be included based on the element.

In the drawings, the thickness or size of each element may be exaggerated, omitted or schematically illustrated for convenience and clarity of description. In addition, the size of each element does not wholly reflect an actual size thereof.

FIG. 1 is a perspective view illustrating a two-edge type backlight unit according to an embodiment.

As shown in FIG. 1, the backlight unit according to the embodiment includes a bottom cover 100, at least one cover plate 200, at least one reflector support part 300, at least one support pin 340, and at least one light source module 400.

In the illustrated case, the backlight unit includes cover plates 200, and the cover plates 200 are arranged at opposite side portions of the bottom cover 100 to form an open region for opening an upper portion of the bottom cover 100. Unlike the embodiment shown in FIG. 1, the cover plates 200 may be disposed at four side portions of the bottom cover 100 in accordance with another example.

Subsequently, the at least one reflector support part 300 may be disposed on the bottom cover 100. In accordance with the embodiment, the reflector support part 300 may be comprised of a plurality of reflector support parts as shown in FIG. 1. The reflector support part 300 may be made of a metal material such as aluminum or a synthetic resin material such as plastic. The bottom cover 100 may be made of a metal material such as aluminum exhibiting constant stiffness. The bottom cover 100 may also be made of a polymer resin material such as plastic so as to be fabricated by injection molding.

In accordance with the embodiment, the reflector support part 300 may include at least two slanted surfaces adjacent to each other about at least one inflection point.

Figure 2:
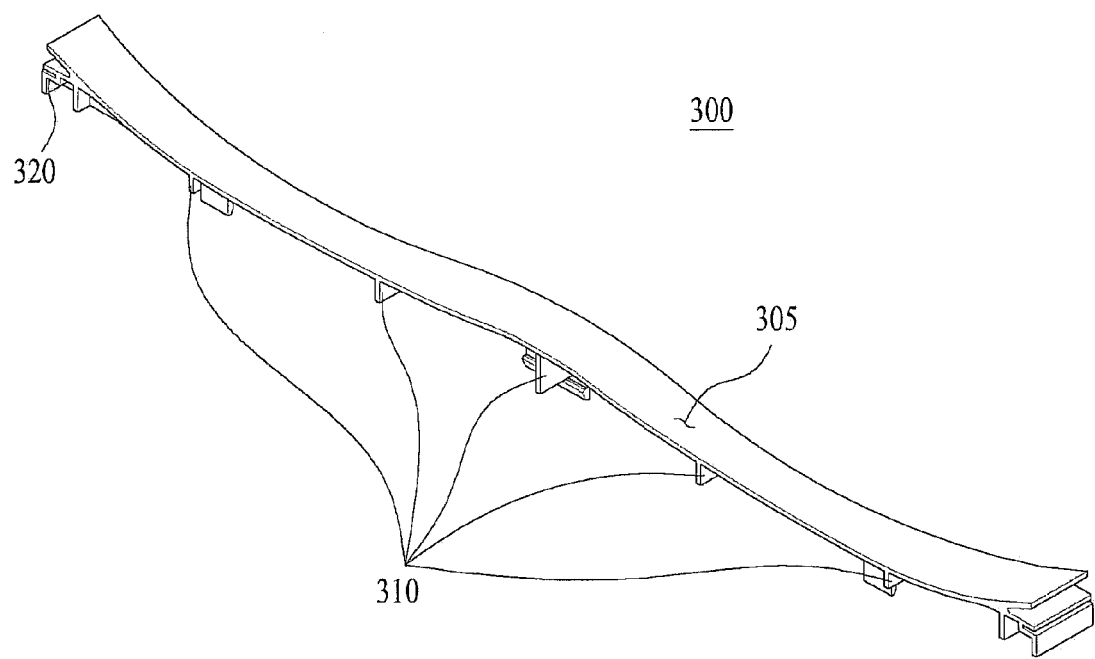
FIG. 2 is a perspective view illustrating an upper portion of a reflector support part according to the embodiment.
Figure 3:
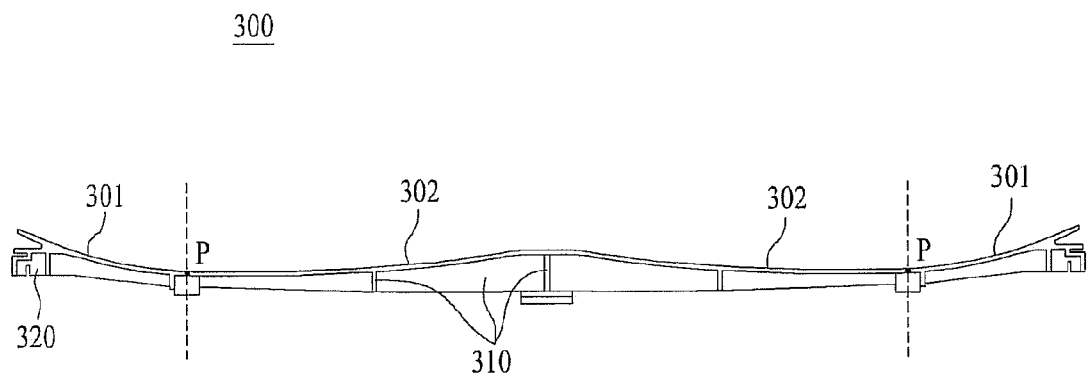
FIG. 3 is a front view illustrating the reflector support part according to the embodiment.

FIG. 2 is a perspective view illustrating an upper portion of the reflector support part 300 according to the embodiment. FIG. 3 is a front view illustrating the reflector support part 300 according to the embodiment.

The reflector support part 300 includes at least two first and second slanted surfaces 301 and 302 adjacent to each other about at least one inflection point P. Also, the reflector support part 300 may further include support legs 310 at lower portions of the slanted surfaces so as to support the first and second slanted surfaces 301 and 302. That is, in accordance with the embodiment, the reflector support part 300 has two inflection points P and the first and second slanted surfaces 301 and 302 adjacent to each other about each of the inflection points P, as shown in FIGS. 2 and 3. However, in accordance with another example, the reflector support part 300 may also have more or fewer slanted surfaces than the above-mentioned slanted surfaces.

The support legs 310 are disposed at a rear side of a bottom surface 305 of the reflector support part 300 so as to allow the reflector support part 300 having the first and second slanted surfaces 301 and 302 to be not bent and be supported.

In addition, the reflector support part 300 may be provided, at opposite ends thereof, with first coupling parts 320, and be fixed to the cover plates 200 by the first coupling parts 320 as described below.

Figure 4:
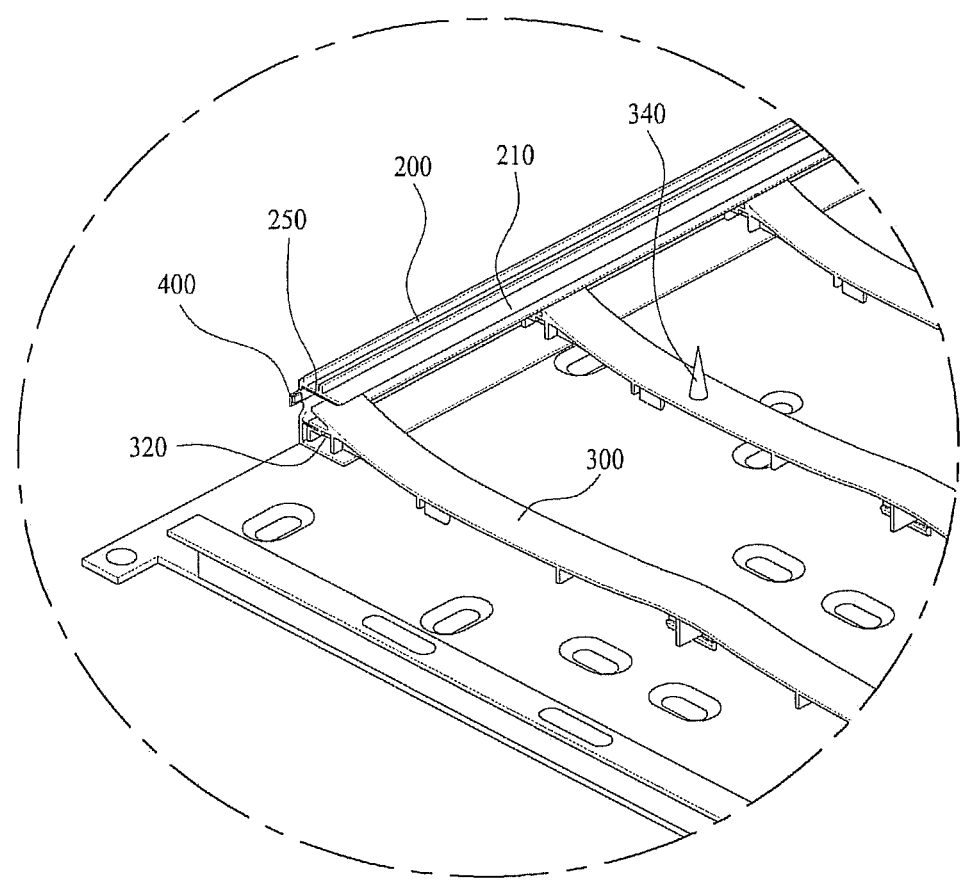
FIG. 4 is an enlarged view of portion A illustrated in FIG. 1.

FIG. 4 is an enlarged perspective view of portion A illustrated in FIG. 1.

As shown in FIG. 4, each of the cover plates 200 includes an optical member support part 210 while being disposed, at a side face thereof, with at least one light source module 400.

A first reflector 250 may also be disposed at a rear side of the optical member support part 210 of each cover plate 200. The first reflector 250 may be disposed at one side of the light source module 400. The first reflector 250 may be made of any one of a reflective coating film and a reflective coating material layer, and may serve to reflect light emitted from the light source module 400 toward the reflector support part 300.

Further, a saw-toothed reflective pattern may be formed on a surface of the first reflector 250 facing the light source module 400. The reflective pattern may have a flat surface or a curved surface.

The surface of the first reflector 250 is provided with the reflective pattern so as to reflect light emitted from the light source module 400 toward a central region of the reflector support part 300, thereby enhancing luminance of a central region of the backlight unit.

The light source module 400 may be positioned between the first reflector 250 and the reflector support part 300, and be disposed close to the first reflector 250 and/or the reflector support part 300.

In some cases, the light source module 400 may come into contact with the first reflector 250 while being simultaneously disposed to be spaced apart from the reflector support part 300 by a predetermined clearance, or may come into contact with the reflector support part 300 while being simultaneously disposed to be spaced apart from the first reflector 250 by a predetermined clearance.

Alternatively, the light source module 400 may be disposed to be spaced apart from both the first reflector 250 and the reflector support part 300 by a predetermined clearance, or may also come into contact with the first reflector 250 and the reflector support part 300 at the same time.

The reflector support part 300 may have a slanted surface having a predetermined slanted angle with respect to a horizontal plane parallel to the surface of the first reflector 250.

Figure 5:
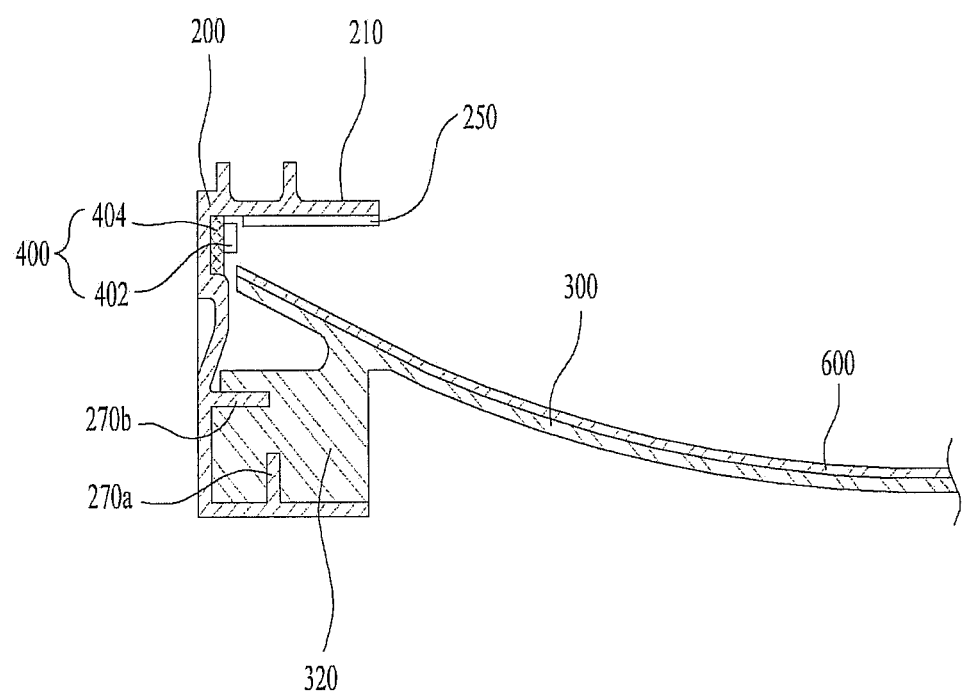
FIG. 5 is a partially sectional view illustrating the backlight unit according to the embodiment.

FIG. 5 is a partially sectional view schematically illustrating a coupling structure between one cover plate 200 and the reflector support part 300, according to the embodiment.

As shown in FIG. 5, each first coupling part 320 of the reflector support part 300 has a groove having a predetermined pattern. Each cover plate 200 is formed with protrusions 270a and 270b corresponding to the pattern of the groove of the first coupling part 320. Accordingly, the protrusions 270a and 270b of the cover plate 200 are fitted into the groove of the reflector support part 300 so that the reflector support part 300 may be coupled and fixed to the cover plate 200.

In accordance with another example, each of the cover plates 200 and the reflector support part 300 is formed with a coupling part such as a through hole so as to fit a separate fastening means such as a screw into the through hole, and thus the reflector support part 300 may be coupled to the cover plates 200.

Referring to FIG. 5, the light source module 400 may be disposed at each cover plate 200 between the first reflector 250 and a second reflector 600, and may include at least one light source 402 (or a light emitting element) for generation of light and a circuit board 404 having an electrode pattern.

In this case, the light source 402 may be a Light Emitting Diode (LED) chip. The LED chip may be a blue LED chip or ultraviolet LED chip, or may be a package combining at least one or more selected from a group comprised of a red LED chip, green LED chip, blue LED chip, yellow green LED chip and white LED chip.

A white LED may be embodied by coupling a yellow phosphor to a blue LED, coupling both red and green phosphors to the blue LED at the same time, or by coupling yellow, red and green phosphors to the blue LED at the same time.

At least one light source 402 may be mounted on the circuit board 404, and an adaptor for supply of power and the electrode pattern (not shown) for connection of the light source 402 may be formed on the circuit board 404.

For example, a carbon nanotube electrode pattern may be formed on an upper surface of the circuit board 404 so as to connect the light source 402 and the adaptor to each other.

The circuit board 404 may be a Printed Circuit Board (PCB) made of polyethylene terephthalate (PET), glass, polycarbonate (PC), silicon (Si), or the like, on which a plurality of light sources is mounted, or may take the form of a film.

In addition, the circuit board 404 may be selected from a group comprised of a single-layer PCB, a multi-layer PCB, a ceramic board, a metal core PCB, and the like.

Meanwhile, the second reflector 600 may be disposed to come into contact with the first and second slanted surfaces 301 and 302 of the reflector support part 300. That is, the slanted surfaces of the reflector support part 300 may have the same structure as that of the second reflector 600. The second reflector 600 may take the form of a reflective sheet.

Accordingly, light emitted from the light source module 400 disposed at each cover plate 200 may be reflected by the second reflector 600 disposed at an upper portion of the reflector support part 300 so as to be emitted into the open region of the cover plate 200.

The first reflector 250 may be spaced apart from the second reflector 600 while interposing the light source module 400 therebetween to form an empty space, and thus a structure of an air guide may be formed.

Hereinafter, the slanted surfaces of the reflector support part 300 will be described with reference to the annexed drawings.

Figure 6:
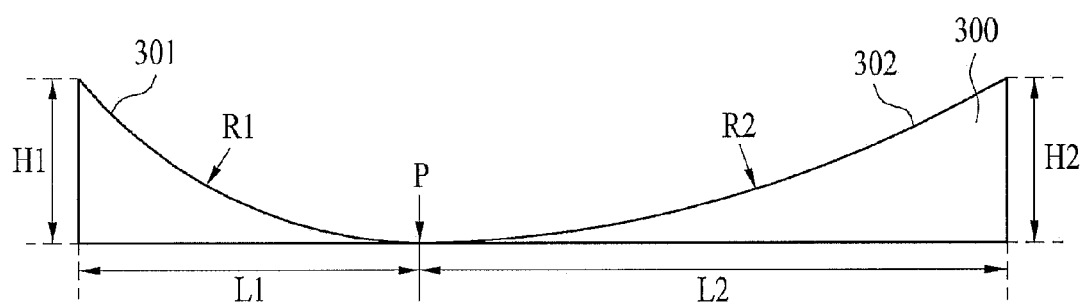
FIGS. 6 and 7 are sectional views schematically explaining a shape of the reflector support part.
Figure 7:
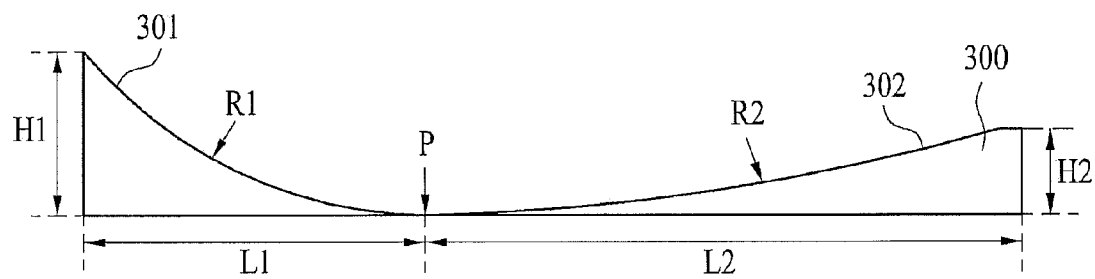

FIGS. 6 and 7 are sectional views explaining a shape of the reflector support part 300. As shown in FIGS. 6 and 7, the first and second slanted surfaces 301 and 302 adjacent to each other about the inflection point P may have first and second radii of curvature R1 and R2 different from each other, respectively.

The inflection point P between the first and second slanted surfaces 301 and 302 may be positioned close to the light source module 400, or may also be positioned to be far away from the light source module 400.

The first slanted surface 301 is disposed closer to the light source module 400 than the second slanted surface 302. Accordingly, when the first radius of curvature R1 of the first slanted surface 301 is less than the second radius of curvature R2 of the second slanted surface 302, the inflection point P may be positioned at a region of the reflector support part 300 close to the light source module 400. However, when the first radius of curvature R1 of the first slanted surface 301 close to the light source module 400 is greater than the second radius of curvature R2 of the second slanted surface 302, the inflection point P may be positioned at a region of the reflector support part 300 being far away from the light source module 400.

As described above, the first radius of curvature R1 of the first slanted surface 301 may differ from the second radius of curvature R2 of the second slanted surface 302. The first radius of curvature R1 of the first slanted surface 301, however, may also be equal to the second radius of curvature R2 of the second slanted surface 302.

Meanwhile, a maximum height H1 of the first slanted surface 301 may be equal to or differ from a maximum height H2 of the second slanted surface 302.

For example, the first radius of curvature R1 of the first slanted surface 301 may be less than the second radius of curvature R2 of the second slanted surface 302, the maximum height H1 of the first slanted surface 301 may be equal to the maximum height H2 of the second slanted surface 302, and a distance L1 between the inflection point P and a distal end of the first slanted surface 301 may be less than a distance L2 between the inflection point P and a distal end of the second slanted surface 302, as shown in FIG. 6.

On the other hand, the first radius of curvature R1 of the first slanted surface 301 may be less than the second radius of curvature R2 of the second slanted surface 302, the maximum height H1 of the first slanted surface 301 may be greater than the maximum height H2 of the second slanted surface 302, and the distance L1 between the inflection point P and the distal end of the first slanted surface 301 may be less than the distance L2 between the inflection point P and the distal end of the second slanted surface 302, as shown in FIG. 7.

The backlight unit including the reflector support part 300 will now be described in more detail.

Figure 8:
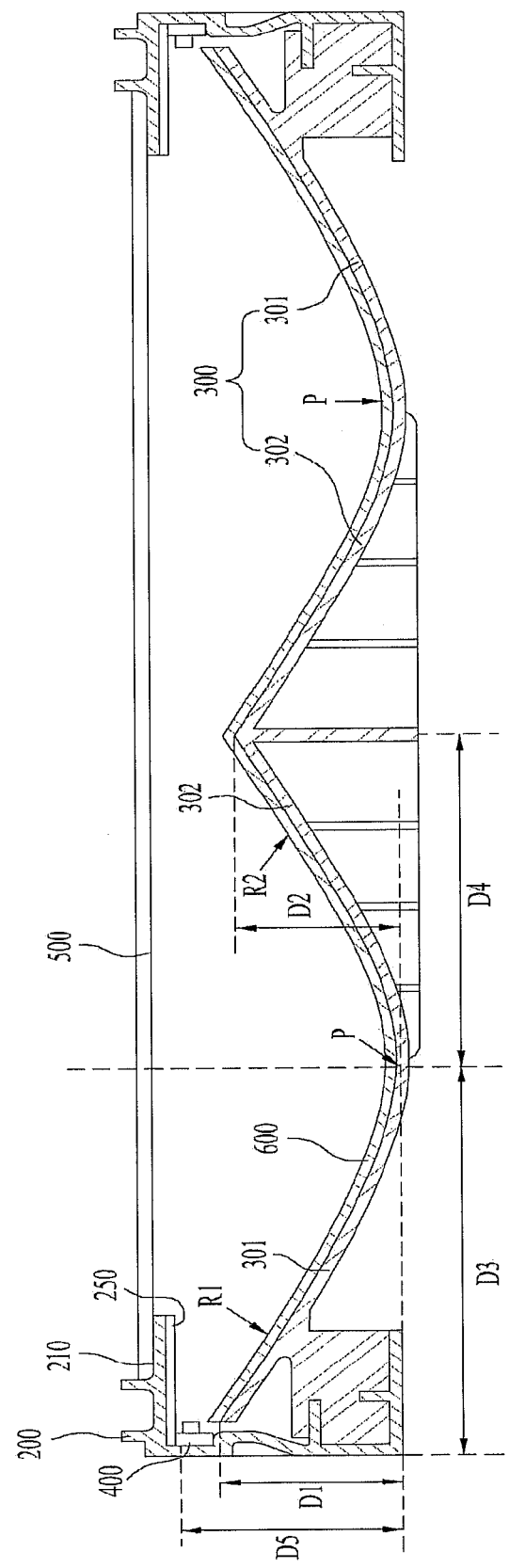
FIG. 8 is a sectional view illustrating the backlight unit according to the embodiment.

FIG. 8 is a sectional view illustrating the backlight unit according to the embodiment.

As shown in FIG. 8, the first radius of curvature R1 of the first slanted surface 301 close to the light source module 400 may be less or greater than the second radius of curvature R2 of the second slanted surface 302.

In some cases, the first radius of curvature R1 of the first slanted surface 301 may also be equal to the second radius of curvature R2 of the second slanted surface 302.

Here, a ratio of the first radius of curvature R1 of the first slanted surface 301 to the second radius of curvature R2 of the second slanted surface 302 may be in a range of 1:0.1 to 1:10.

A first distance D1 between a first horizontal line extending from the inflection point P and a second horizontal line extending from a distal end point of the first slanted surface 301 may be equal to a second distance D2 between the first horizontal line extending from the inflection point P and a third horizontal line extending from a distal end point of the second slanted surface 302.

In some cases, the first distance D1 between the first horizontal line extending from the inflection point P and the second horizontal line extending from the distal end point of the first slanted surface 301 may also be less or greater than the second distance D2 between the first horizontal line extending from the inflection point P and the third horizontal line extending from the distal end point of the second slanted surface 302.

Here, a ratio of the first distance D1 to the second distance D2 may be in a range of 1:0.01 to 1:5.

Further, a third distance D3 between a first vertical line extending from the inflection point P and a second vertical line extending from the distal end point of the first slanted surface 301 may be less or greater than a fourth distance D4 between the first vertical line extending from the inflection point P and a vertical line extending from the distal end point of the second slanted surface 302.

In some cases, the third distance D3 between the first vertical line extending from the inflection point P and the second vertical line extending from the distal end point of the first slanted surface 301 may also be equal to the fourth distance D4 between the first vertical line extending from the inflection point P and the vertical line extending from the distal end point of the second slanted surface 302.

Here, a ratio of the third distance D3 to the fourth distance D4 may be in a range of 1:0.05 to 1:20.

Subsequently, a fifth distance D5 between the first horizontal line extending from the inflection point P and a fourth horizontal line extending from a point of the light source module 400 may be equal to the second distance D2 between the first horizontal line extending from the inflection point P and the third horizontal line extending from the distal end point of the second slanted surface 302.

However, in some cases, the fifth distance D5 between the first horizontal line extending from the inflection point P and the fourth horizontal line extending from the point of the light source module 400 may also be greater than the second distance D2 between the first horizontal line extending from the inflection point P and the third horizontal line extending from the distal end point of the second slanted surface 302.

Also, the reflector support part 300 may have a symmetrical shape with respect to a center of the bottom cover 100. That is, the first and second slanted surfaces 301 and 302 of the reflector support part 300 may be formed to be symmetrical with respect to a center of the reflector support part 300, as shown in FIG. 8.

In addition, the central region of the reflector support part 300 may have a convex curved surface shape. In some cases, the central region of the reflector support part 300 may also have a flat plane shape or a concave curved surface shape. That is, the central region of the reflector support part 300 may also have any one of the flat plane, convex curved surface, and concave curved surface shapes, and may also be formed in a plurality of shapes.

Referring to FIG. 8, an optical member 500 may be supported by the optical member support part 210 of each cover plate 200, and be disposed to face the reflector support part 300.

The optical member 500 may include at least one sheet selected from a group comprised of a diffusion sheet, prism sheet, luminance enhancement sheet, and the like.

The diffusion sheet serves to diffuse light emitted from the light source module, the prism sheet serves to guide the diffused light to a light emitting region, and the luminance enhancement sheet serves to enhance luminance.

At least one of upper and lower surfaces of the optical member 500 may be formed with an uneven pattern for uniform diffusion of light.

Figure 9:
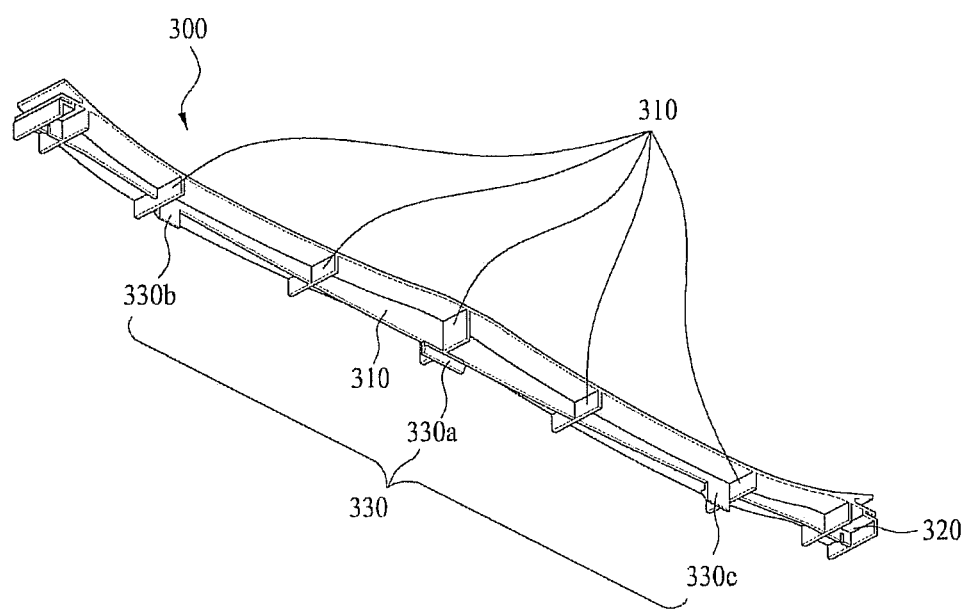
FIG. 9 is a perspective view illustrating a back portion of the reflector support part according to the embodiment.

FIG. 9 is a perspective view illustrating a back portion of the reflector support part 300 according to the embodiment.

As shown in FIG. 9, the reflector support part 300 may include support legs 310 and at least one second coupling part 330. The support legs 310 and the second coupling part 330 are formed at a rear side of the reflector support part 300.

The second coupling part 330 is fastened with a third coupling part formed on a bottom surface of the bottom cover 100, to fix the reflector support part 300 to the bottom cover 100.

In accordance with the embodiment, the reflector support part 300 includes second coupling parts in the illustrated case, and the second coupling parts 330 may include three insertion protrusions 330a, 330b, and 330c formed at the rear side 307 of the reflector support part 300, respectively.

In accordance with the embodiment, a plurality of insertion protrusions 330a, 330b, and 330c may be disposed to protrude in different directions from one another. That is, the first insertion protrusion 330a positioned at a central one of the support legs 310 of the reflector support part 300 may protrude in a first direction, and the second and third insertion protrusions 330b and 330c positioned at opposite ones of the support legs 310 may protrude in a second direction opposite the first direction, as shown in FIG. 9. Hereinafter, the following description will be given in conjunction with third coupling parts, for example, insertion grooves formed at the bottom cover 100 in order to fit the first to third insertion protrusions 330a to 330c.

As such, the reflector support part 300 is more firmly fixed to a bottom surface of the bottom cover 100 without bending in left and right directions because a protruding direction of the first insertion protrusion 330a is opposed to a protruding direction of the second and third insertion protrusions 330b and 330c.

Although the second coupling parts 330 have shapes such as the insertion protrusions 330a, 330b, and 330c as shown in FIG. 9, the second coupling parts 330 may have through hole shapes so that the reflector support part 300 may be fixed to the bottom surface of the bottom cover 100 using another fastening means such as a screw according to another example.

Figure 10:
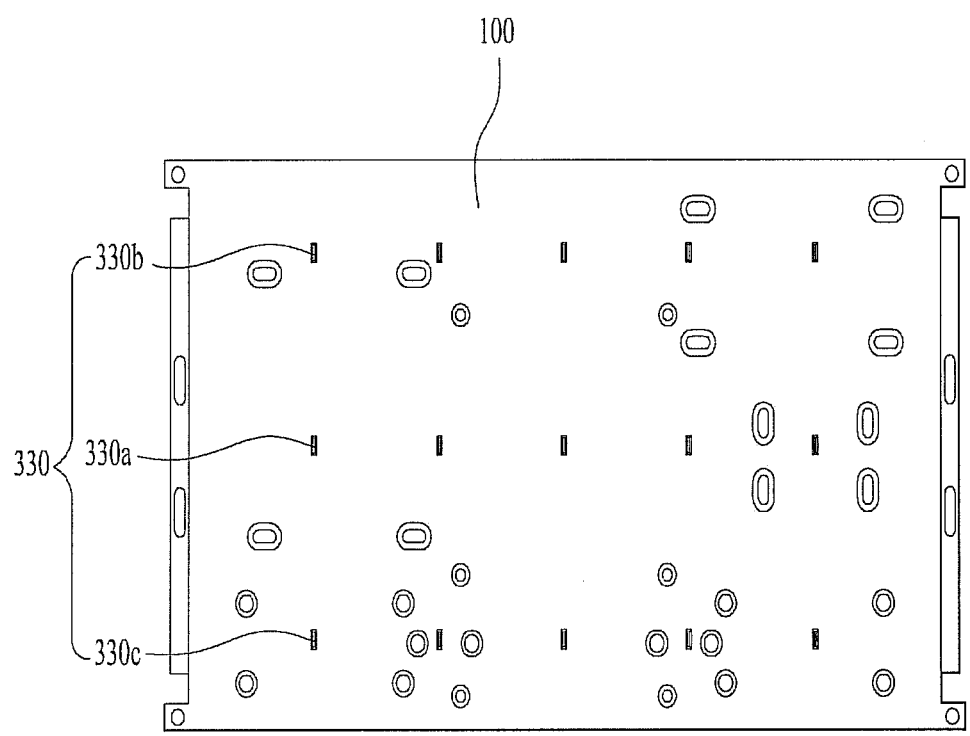
FIG. 10 is a rear view illustrating a bottom cover according to the embodiment.
Figure 11:
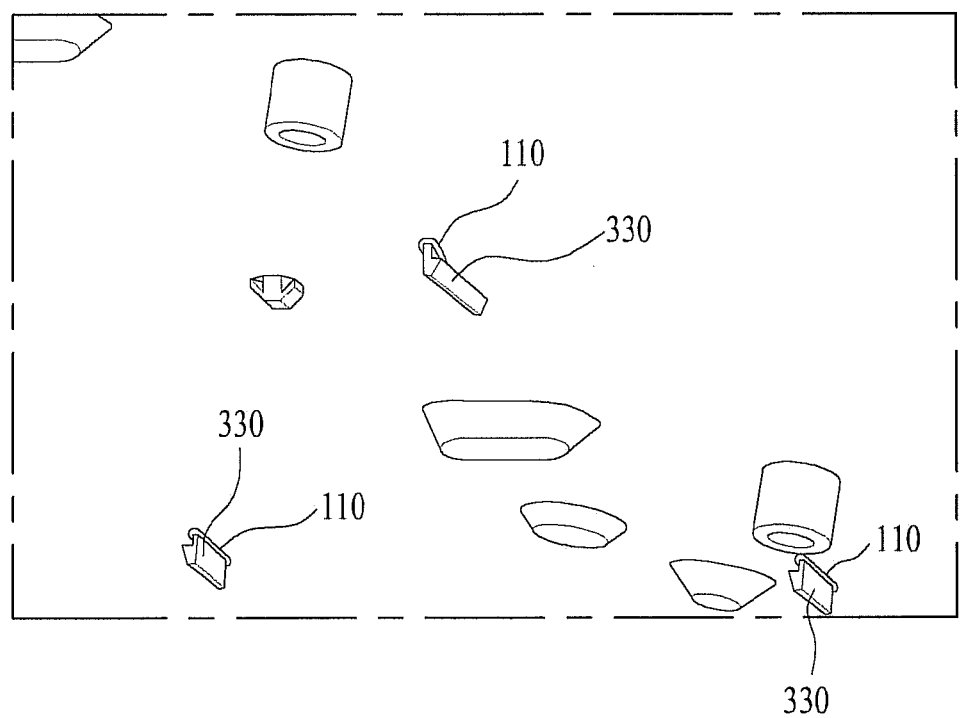
FIG. 11 is an enlarged view of a coupling form between the bottom cover and the reflector support part shown in FIG. 10.

FIG. 10 is a rear view illustrating the bottom cover 100 according to the embodiment. FIG. 11 is an enlarged view of a coupling portion between the bottom cover 100 and the reflector support part 300 shown in FIG. 10.

As shown in FIG. 10, the reflector support part 300 is fixed to the bottom surface of the bottom cover 100 using the plural second coupling parts 330.

Referring to FIG. 11 illustrating the coupling portion between the bottom cover 100 and the reflector support part 300, the second coupling parts 330 of the reflector support part 300 may have shapes such as the insertion protrusions 330a, 330b, and 330c, and the third coupling parts of the bottom cover 100 may be formed in the form of the insertion grooves 110 at the bottom surface. The reflector support part 300 is fixed to the bottom cover 100 by respectively fitting the insertion protrusions 330a, 330b, and 330c into the insertion grooves 110.

Each of the insertion protrusions 330 is formed, at a lower half thereof, in a triangle shape. Thus, when the reflector support part 300 is arranged at a corresponding position of an upper bottom surface of the bottom cover 100 and is pressed toward the bottom cover 100, the insertion protrusion 330 is slidably inserted and fastened into the corresponding insertion groove 110 such that the reflector support part 300 may be fixed to the bottom cover 100.

In accordance with the embodiment, the reflector support part 300 is coupled to the bottom cover 100 by the above-mentioned configuration. As a result, a backlight unit with an air guide having excellent strength and reflection characteristics may be provided, and the backlight unit may achieve improved reliability.

Also, as shown in FIG. 1 or 4, the reflector support part 300 may also be formed, at the upper portion thereof, with the at least one support pin 340 for support of the optical member 500. This is because the optical member 500 is spaced apart from the reflector support part 300 to define the air guide therebetween, and thus a central region of the optical member 500 may sag downward. Here, the support pin 340 may be stably configured such that the area of a lower surface thereof coming into contact with the reflector support part 300 is greater than the area of an upper surface thereof.

In another embodiment, the backlight unit of the above-mentioned embodiment, for example, including the first and second reflector 250 and 600 and the light source module 400 may be applied to a display device, an indicating device and a lighting system, and the lighting system, for example, may include a lamp, a streetlamp, and the like.

The lighting system may be utilized as a lamp for allowing light to be emitted by focusing a plurality of LEDs, particularly as a downlight lamp which is embedded in a ceiling or wall of a building and is mounted to expose an opening side of a shade.

As is apparent from the above description, a backlight unit with an air guide having excellent strength and reflection characteristics may be provided, and the backlight unit may achieve improved reliability.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lighting system, comprising:
   a first reflector and a bottom cover;
   a plurality of reflector support parts disposed between the first reflector and the bottom cover, each of the reflector support parts having a first slanted surface that is adjacent to a second slanted surface about at least one boundary, the first and second slanted surfaces having curved shapes, wherein each of the reflector support parts includes support legs;
   a second reflector disposed on the plurality of reflector support parts and extending along the first and second slanted surfaces of the plurality of reflector support parts, the second reflector having a curved shape that corresponds to the curved shapes of the plurality of reflector support parts; and
   a light source module disposed between the first reflector and the second reflector, the light source module including a light emitting diode;
   a cover plate coupled to opposite side portions of the bottom cover, the light source module and the first reflector being disposed at the cover plate;
   and an optical member facing the reflector support parts and supported by the cover plate; and at least one reflector support part has a support pin formed on an upper portion to support the optical member,
   wherein the support legs include
   a first support leg disposed at a rear side of the first slanted surface, the rear side of the first slanted surface being in a rearward direction with respect to a front of the first slanted surface facing the second reflector, and
   a second support leg disposed at a rear side of the second slanted surface, the rear side of the second slanted surface being in a rearward direction with respect to a front of the second slanted surface facing the second reflector.

2. The lighting system according to claim 1, wherein a central region of each of the reflector support parts has at least one selected from the group consisting a flat plane shape, convex curved surface shape, and concave curved surface shape.

3. The lighting system according to claim 1, wherein each of the reflector support parts has a symmetrical shape based on a center of the bottom cover.

4. The lighting system according to claim 1, wherein one end of each of the reflector support parts is fixed to the cover plate.

5. The lighting system according to claim 1, wherein:
   at least one reflector support part has a coupling part formed on a rear side, the coupling part also formed at a bottom surface of the bottom cover; and
   the at least one reflector support part having the coupling part is fixed to the bottom cover by the coupling part.

6. The lighting system according to claim 5, wherein the coupling part comprises:
   at least one reflector support part has an insertion protrusion formed on the rear side; and
   the insertion protrusion is fitted into an insertion groove formed on the bottom cover so as to allow the insertion protrusion to be fitted therein.

7. The lighting system according to claim 6, wherein the insertion protrusion includes a plurality of insertion protrusions disposed to protrude in different directions from one another.

8. The lighting system according to claim 1, wherein the light source module is disposed over an outer portion of the bottom cover and the first slanted surface is disposed closer to the light source module than the second slanted surface, and radii of curvature of the first and second slanted surfaces differ from each other.

9. The lighting system according to claim 8, wherein a maximum height of the first slanted surface is equal to a maximum height of the second slanted surface, the maximum height being measured in a vertical direction perpendicular to the plane of the bottom cover from a lower portion of the reflector support part.

10. The lighting system according to claim 8, wherein a maximum height of the first slanted surface differs from a maximum height of the second slanted surface.

11. The lighting system according to claim 10, wherein the maximum height of the first slanted surface is greater than the maximum height of the second slanted surface.

12. The lighting system according to claim 8, wherein the radius of curvature of the first slanted surface is less than the radius of curvature of the second slanted surface.

13. The lighting system according to claim 8, wherein a first distance between a first horizontal line extending from the boundary nearest a distal end point of the first slanted surface and a second horizontal line extending from a distal end point of the first slanted surface is less than a second distance between the first horizontal line and a third horizontal line extending from a distal end point of the second slanted surface.

14. The lighting system according to claim 8, wherein a first distance between a first horizontal line extending from a boundary farthest from a distal end point of the first slanted surface and a second horizontal line extending from a distal end point of the first slanted surface is greater than or equal to a second distance between the first horizontal line and a third horizontal line extending from a distal end point of the second slanted surface.

15. The lighting system according to claim 8, wherein a third distance between a first vertical line extending from a boundary nearest a distal end point of the first slanted surface and a second vertical line extending from a distal end point of the first slanted surface is less than or equal to a fourth distance between the first vertical line and a third vertical line extending from a distal end point of the second slanted surface.

16. The lighting system according to claim 8, wherein a fifth distance between a first horizontal line extending from the inflection point and a fourth horizontal line extending from the point of the light source module nearest the boundary is greater than a second distance between the first horizontal line and a third horizontal line extending from a distal end point of the second slanted surface.

17. The lighting system according to claim 8, wherein a ratio of the radius of curvature of the first slanted surface to the radius of curvature of the second slanted surface is in the range of spanning 1:1 to 1:10.

18. A display device, comprising:
a display panel;
a first reflector and a bottom cover;
a plurality of reflector support parts disposed between the first reflector and the bottom cover, each of the reflector support parts having at least a first slanted surface and a second slanted surface adjacent to each other about at least one boundary, the first and second slanted surfaces having curved shapes, wherein each of the reflector support parts includes support legs;
a second reflector disposed on the plurality of reflector support parts and extending along the first and second slanted surfaces of the plurality of reflector support parts, the second reflector having a curved shape that corresponds to the curved shapes of the plurality of reflector support parts; and
a light source module disposed between the first reflector and the second reflector, the light source module including a light emitting diode emitting a light for the display panel;
a cover plate coupled to opposite side portions of the bottom cover, the light source module and the first reflector being disposed at the cover plate; and
an optical member facing the reflector support parts and supported by the cover plate, and at least one reflector support part has a support pin formed on an upper portion to support the optical member,
wherein the support legs include
a first support leg disposed at a rear side of the first slanted surface, the rear side of the first slanted surface being in a rearward direction with respect to a front of the first slanted surface facing the second reflector, and
a second support leg disposed at a rear side of the second slanted surface, the rear side of the second slanted surface being in a rearward direction with respect to a front of the second slanted surface facing the second reflector.

* * * * *